(12) United States Patent
Lutz

(10) Patent No.: US 6,769,536 B2
(45) Date of Patent: Aug. 3, 2004

(54) EXPANDABLE OVER AND UNDER LINE FEED SYSTEM

(76) Inventor: David W. Lutz, 1223 Dickenson Dr., Carlisle, PA (US) 17013

( * ) Notice: Subject to any disclaimer, the term of this patent is extended or adjusted under 35 U.S.C. 154(b) by 0 days.

(21) Appl. No.: 09/813,645

(22) Filed: Mar. 21, 2001

(65) Prior Publication Data

US 2002/0008000 A1 Jan. 24, 2002

Related U.S. Application Data

(60) Provisional application No. 60/191,071, filed on Mar. 21, 2000.

(51) Int. Cl.[7] .............................................. B65G 41/00
(52) U.S. Cl. .................................. 198/861.1; 198/465.1
(58) Field of Search ........................... 198/465.1, 861.1

(56) References Cited

U.S. PATENT DOCUMENTS

| | | | | |
|---|---|---|---|---|
| 3,251,450 A | * | 5/1966 | Ridder | 198/27 |
| 3,388,812 A | * | 6/1968 | Cooper | 214/1 |
| 3,557,938 A | * | 1/1971 | Christensen | 198/126 |
| 3,578,145 A | * | 5/1971 | Kuehl | 198/115 |
| 3,820,650 A | * | 6/1974 | Garvey | 198/204 |
| 3,835,982 A | * | 9/1974 | Zappia | 198/204 |
| 4,194,633 A | * | 3/1980 | Paterson et al. | 209/152 |
| 4,261,460 A | * | 4/1981 | Peterson, II | 198/828 |
| 4,564,348 A | * | 1/1986 | Hehl | 425/151 |
| 4,572,760 A | * | 2/1986 | Marchetti | 156/468 |
| 4,598,819 A | * | 7/1986 | Siegwart | 198/861.1 |
| 4,684,314 A | * | 8/1987 | Luth | 414/745 |
| 4,715,488 A | * | 12/1987 | Hewitt et al. | 193/35 R |
| 4,789,056 A | * | 12/1988 | Bourbeau | 198/823 |
| 4,804,077 A | * | 2/1989 | John, Jr. | 198/339.1 |
| 4,898,272 A | * | 2/1990 | Swinderman et al. | 198/841 |
| 4,930,623 A | * | 6/1990 | Johnson et al. | 198/465.1 |
| 4,951,809 A | * | 8/1990 | Boothe et al. | 198/841 |
| 4,977,999 A | * | 12/1990 | Smock | 198/463.3 |
| 5,078,250 A | * | 1/1992 | Cole | 193/35 R |
| 5,162,029 A | * | 11/1992 | Gerard | 482/71 |
| 5,197,590 A | * | 3/1993 | Prim et al. | 198/300 |
| 5,205,400 A | * | 4/1993 | Breuss et al. | 198/812 |
| 5,244,079 A | * | 9/1993 | Osamu | 198/465.1 |
| 5,577,597 A | * | 11/1996 | Kakida et al. | 198/465.1 |
| 5,762,178 A | * | 6/1998 | Tarlton | 198/860.2 |
| 5,797,481 A | * | 8/1998 | Uber et al. | 198/813 |
| 6,012,568 A | * | 1/2000 | Kane | 198/817 |
| 6,086,061 A | * | 7/2000 | Vedoy et al. | 271/3.01 |
| 6,095,319 A | * | 8/2000 | Noniewicz et al. | 198/632 |
| 6,179,116 B1 | * | 1/2001 | Noniewicz et al. | 198/632 |
| 6,193,055 B1 | * | 2/2001 | Brink | 198/827 |
| 6,227,357 B1 | * | 5/2001 | Brown, Sr. | 198/861.4 |
| 6,247,581 B1 | * | 6/2001 | Oswald et al. | 198/812 |

FOREIGN PATENT DOCUMENTS

| | | | | |
|---|---|---|---|---|
| DE | 1153323 | * | 8/1963 | |
| JP | 4-352629 | * | 12/1992 | B65B/69/00 |
| SU | 1261857 | | 10/1986 | |
| SU | 1261857 A1 | * | 10/1986 | B65G/17/06 |

OTHER PUBLICATIONS

"Non–stop delivery for non stop production." A.T.S. Over and Under Line Feed System Product Brochure (1997).

* cited by examiner

Primary Examiner—James R. Bidwell
Assistant Examiner—Rashmi Sharma
(74) Attorney, Agent, or Firm—Webb Ziesenheim Logsdon Orkin & Hanson, P.C.

(57) ABSTRACT

An adjustable over and under line feed system having a first end, a second end, a plurality of adjustable first support legs, a plurality of adjustable second support legs, and a plurality of adjustable support cross members connected substantially perpendicular to a corresponding one of the plurality of adjustable first support legs and a corresponding one of the plurality of adjustable second support legs, and a conveyor assembly positioned substantially perpendicular to the plurality of adjustable support cross members.

14 Claims, 3 Drawing Sheets

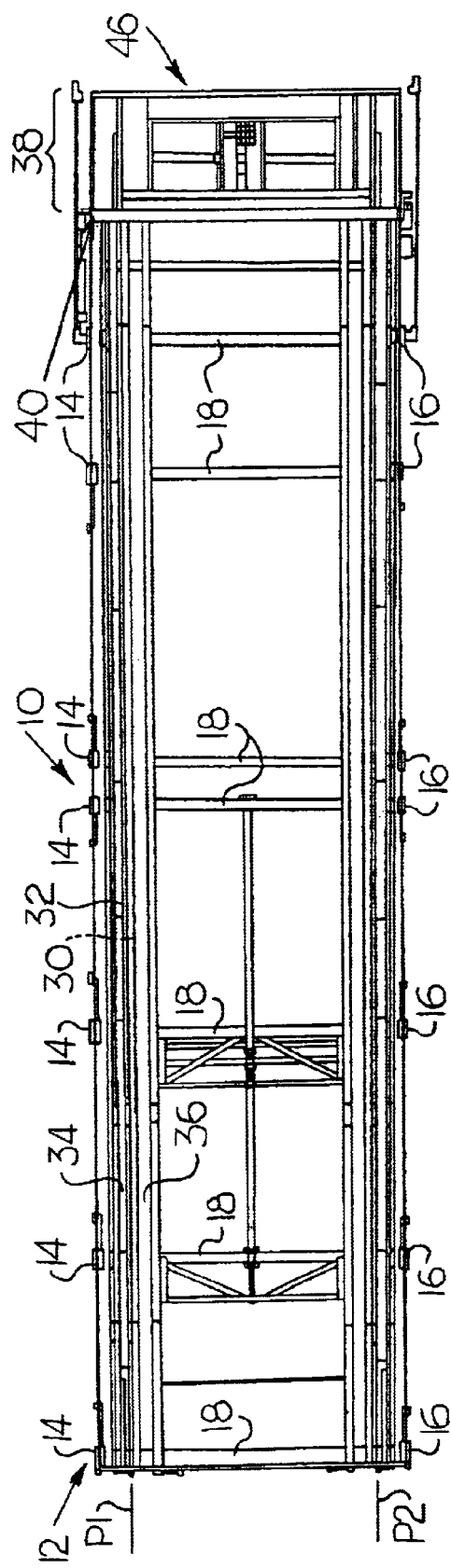
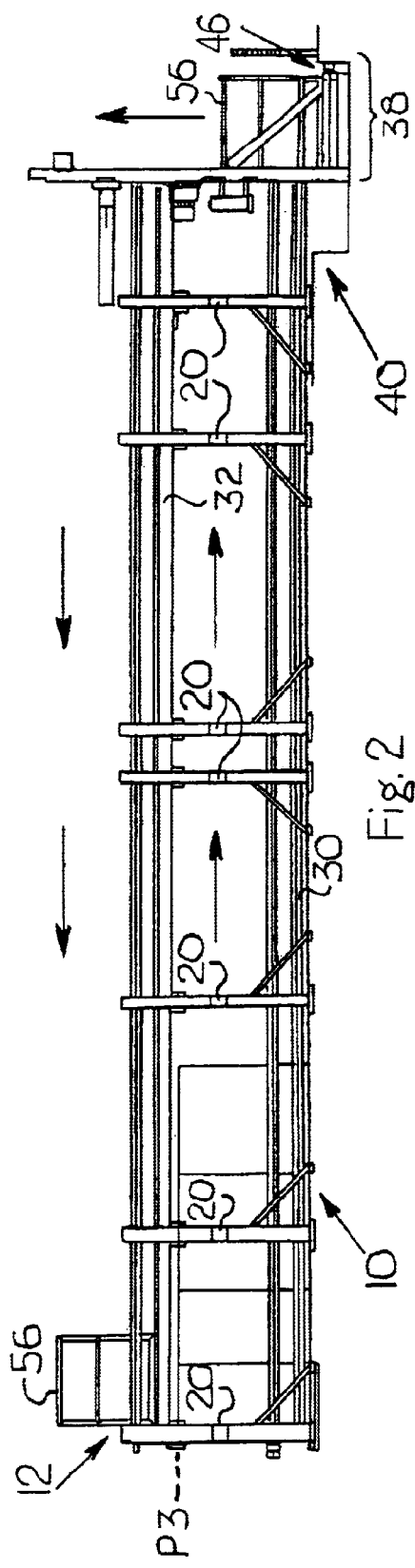

EXPANDABLE OVER AND UNDER LINE FEED SYSTEM

CROSS-REFERENCE TO RELATED APPLICATION

This application claims the benefit of earlier filed United States Provisional Patent Application Serial No. 60/191,071, filed Mar. 21, 2000, and entitled "Expandable Over and under Line Feed System."

BACKGROUND OF THE INVENTION

Field of the Invention

Automated over and under line feed systems have been developed to maximize assembly line parts handling efficiency. These automated over and under line feed systems provide an uninterrupted flow of parts carried in containers or racks. The exact dimensions of the over and under line feed systems depend on the size and quantity of the parts to be carried. One such automated over and under line feed system is manufactured by Master Manufacturers, Inc. of Carlisle, Pa. Another is disclosed in U.S. Pat. No. 4,977,999 to Smock, herein incorporated by reference in its entirety.

Over and under line feed systems maximize assembly line parts handling efficiency and are beneficial where high speed, mass production depends on an uninterrupted flow of parts carried in containers or racks. These rigid line feed systems are constructed based on the size of the parts to be carried. Once such a rigid line feed system is installed, modification of the line feed system to accommodate differently-sized parts is extremely difficult, if not impossible, should a change occur in the product being manufactured such that different size parts are required to be carried by the line feed system. This is particularly the case where the line feed system was constructed to handle parts of a particular size and, due to changes in manufacturing needs, parts of a much larger size are now required to be carried. In such cases, the entire line feed system would have to be removed and replaced with a new, larger capacity line feed system. Such a purchase and substitution of a new line feed system represents a large capital outlay. Further, the down time caused by replacing line feed systems greatly reduces the productivity of the assembly line.

Therefore, it is an object of the present invention to provide an over and under line feed system which can be simply and easily expanded or contracted to allow the line feed system to be adapted to convey parts of differing sizes.

SUMMARY OF THE INVENTION

The present invention generally includes an over and under line feed system having a first end and a second end, a plurality of adjustable first support legs, and a plurality of second support legs, wherein each of the plurality of second support legs is spaced apart from each of the first support legs. Also included is a plurality of adjustable support cross members, wherein each of the plurality of support cross members is connected substantially perpendicular to a corresponding one of the plurality of first support legs and a corresponding one of the plurality of second support legs.

Two of the plurality of adjustable support cross members may be connected substantially perpendicular to a corresponding one of the plurality of first support legs and a corresponding one of the plurality of second support legs, and each of the plurality of adjustable support cross members may lie in substantially the same imaginary plane.

A conveyor assembly may also be provided. The conveyer assembly is preferably positioned adjacent to the plurality of adjustable support cross members, substantially perpendicular to the plurality of adjustable support cross members. The conveyor assembly may include a conveyor track assembly and a plurality of indexing rails.

An elevator assembly may be positioned adjacent to the first frame end. The elevator assembly may include two substantially-parallel elevator supports connected to each other by an elevator cross member, wherein at least one of the substantially-parallel elevator supports is movably connected to the first end of the line feed system. A workstation and a movable elevator may also be provided.

The movable elevator generally includes an adjustable elevator cross member, a pair of adjustable, spaced-apart, substantially-vertical elevator support members, a pair of adjustable, spaced-apart elevator base members, and an adjustable elevator base cross member. The adjustable elevator cross member may be positioned between the pair of adjustable, spaced-apart, substantially-vertical elevator support members, each one of the pair of adjustable, spaced-apart elevator base members are positioned adjacent to a corresponding end of one of the pair of adjustable spaced-apart, vertical elevator support members, and the adjustable elevator base cross member is positioned between each of the pair of adjustable, spaced-apart elevator base members.

At least one method of converting an over and under line feed system to accommodate a larger or smaller container generally includes the step of moving the at least one of the plurality of adjustable support cross members to a length greater than a width of the container. An additional step may include moving the two substantially-parallel elevator supports to a position substantially-parallel to the plurality of adjustable cross members. A plurality of inserts having a plurality of desired heights may also be provided, along with the step of inserting at least one of the plurality of insert into the adjustable first support legs and the adjustable second support legs to increase or decrease an overall length of each of the plurality of adjustable first support legs and each of the plurality of adjustable second support legs. The step of adjusting the elevator to fit the larger or smaller container is also contemplated.

BRIEF DESCRIPTION OF THE DRAWINGS

FIG. 1 is a plan view of a line feed system according to one embodiment of the present invention;

FIG. 2 is a side view of the line feed system shown in FIG. 1;

DETAILED DESCRIPTION OF THE PREFERRED EMBODIMENTS

The line feed system 10 of the present invention, which generally includes a framework 12 that is expandable to allow the line feed system 10 to be adapted to convey parts of differing sizes, is also described in United States Provisional Patent Application Serial No. 60/191,071, filed Mar. 21, 2000, and entitled "Expandable Over and under Line Feed System, which is herein incorporated by reference in its entirety.

Figure 3:
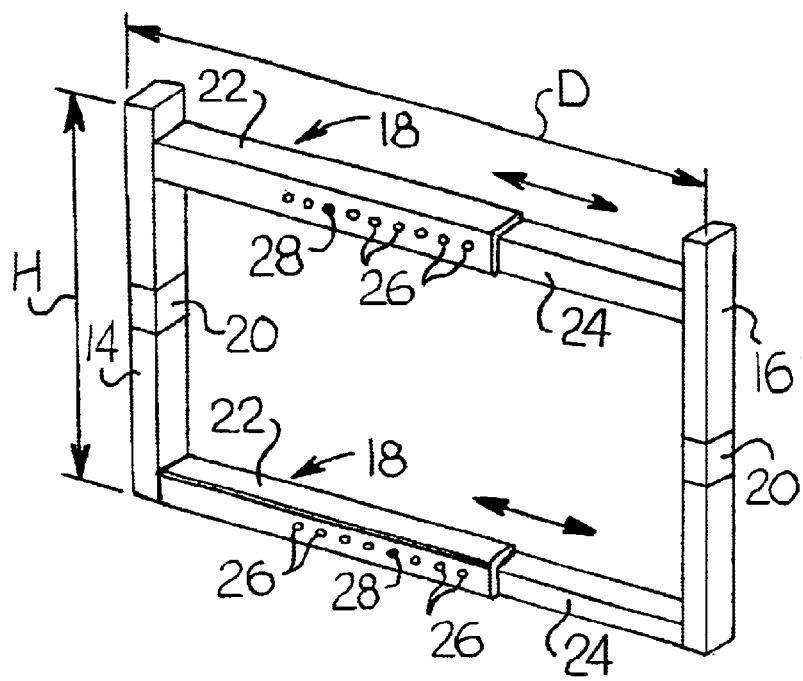
FIG. 3 is a perspective view of a pair of adjustable support legs and a pair of adjustable cross members according to the present invention.

An over and under line feed system according to the present invention is generally designated as reference numeral 10 in FIGS. 1 and 2. As shown in FIG. 1, the line feed system 10 generally includes a substantially-rectangular, rigid metal framework 12 having a plurality of adjustable, spaced apart, substantially vertical first support legs 14, a plurality of adjustable, spaced apart, substantially vertical second support legs 16, and a plurality of adjustable support cross members 18. In the preferred embodiment, as shown in FIG. 1, each of the plurality of first support legs 14 are positioned in a first imaginary plane P1, each of the plurality of second support legs 16 are positioned in a second imaginary plane P2, and each of the plurality of support members lie in substantially the same imaginary plane P3. As shown in FIGS. 2 and 3, each of the plurality of first and second support legs 14, 16 may be configured to receive one or more spacer inserts 20, making the first and second support legs 14, 16 adjustable in height H.

As shown in FIG. 3, each support cross member 18 is preferably formed by a hollow first member 22 and a second member 24, with both the first and second members 22, 24 preferably made from ¼" steel or other suitable material. The second member 24 is preferably slideably or telescopically moveable within the first member 22, allowing a distance D between the support legs 14, 16 to be varied. A series of adjustment holes 26 may be provided in both the first member 22 and the second member 24, so that the holes 26 may be aligned to receive a retaining device, such as a locking bolt 28.

Referring again to FIGS. 1 and 2, the line feed assembly 10 includes a lower conveyer assembly 30 and an upper conveyer assembly 32. As shown in FIG. 1, each conveyer assembly 30, 32 has a conveyer track assembly 34 which may have a plurality of indexing rails 36 and may be extendable. Each indexing rail 36 is preferably a formed channel made of 0.25 inch thick hot rolled A569 PSD cold reduced flat steel plate.

Figure 4:
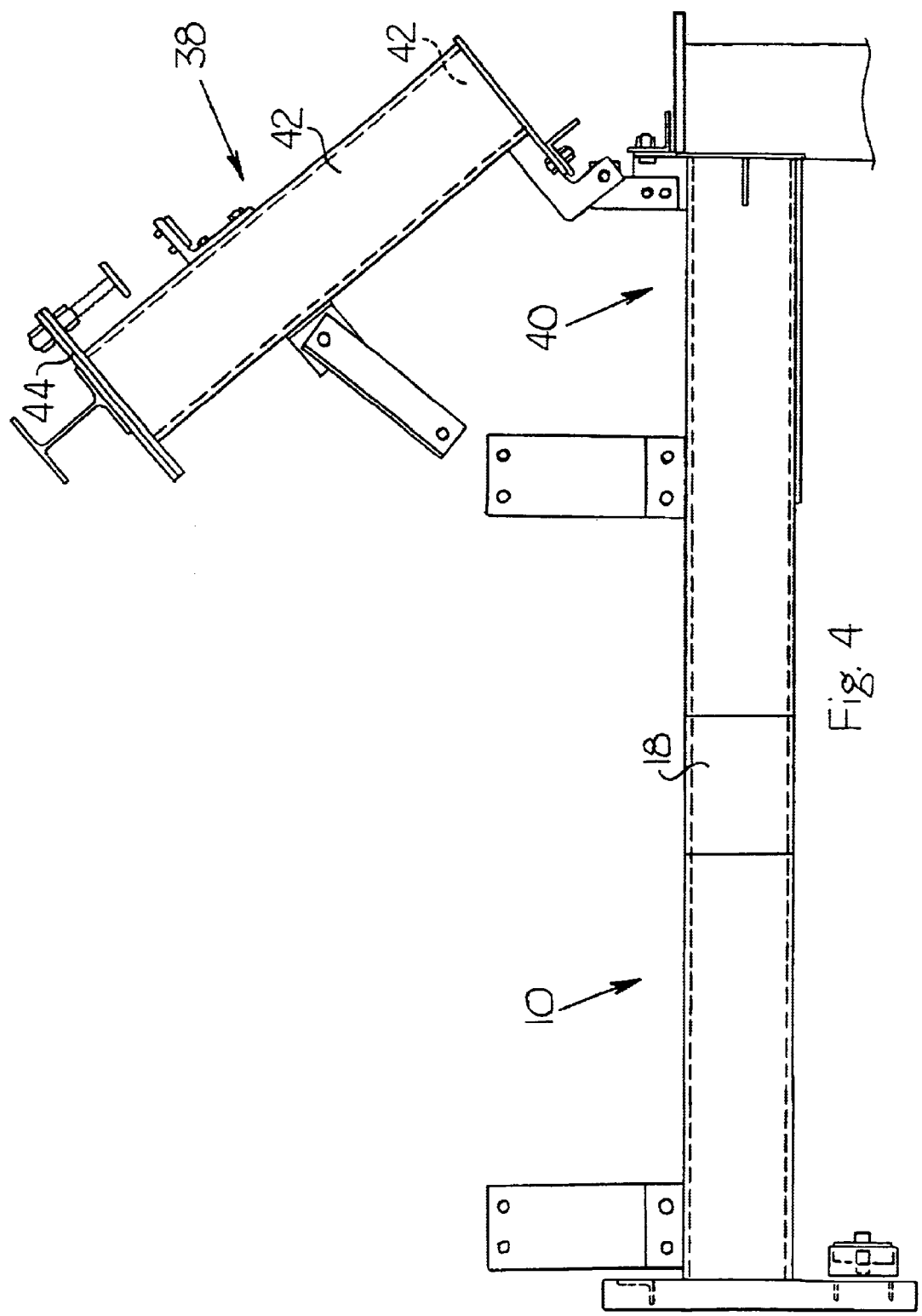
FIG. 4 is side view of a moveable elevator assembly according to the present invention.

FIGS. 1 and 2 show an adjustable elevator assembly 38 positioned at a first end 40 of the line feed assembly 10. As shown in FIG. 4, the elevator assembly 38 includes two substantially parallel elevator supports 42 moveably connected to the first end 40 of the framework 12. The elevator supports 42 are preferably connected to each other by a support cross member 44. Because the elevator supports 42 are movable with respect to the framework 12, the elevator supports 42 can be positioned substantially parallel to the support cross members 18 during shipping, and then extended to a position substantially perpendicular to the support cross members 18 after installation of the framework 12, as shown in FIG. 2.

Figure 5:
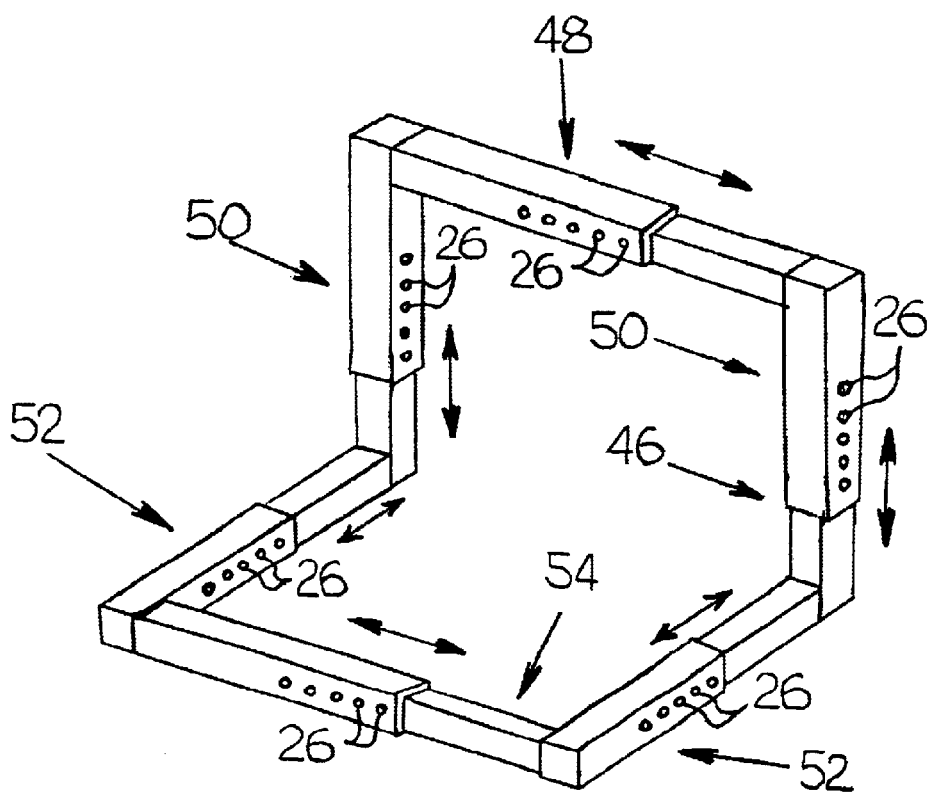
FIG. 5 is a perspective view of an adjustable elevator according to the present invention

As shown in FIGS. 1 and 2, an adjustable, movable elevator 46 is also positioned at the first end 40 of the line feed assembly 10. The moveable elevator 46, shown in greater detail in FIG. 5, generally includes an adjustable elevator cross member 48, a pair of adjustable, spaced apart, substantially vertical elevator support members 50, a pair of adjustable, spaced apart elevator base members 52, and an adjustable elevator base cross member 54. The elevator cross member 48 is positioned between the pair of elevator support members 50 and each one of the pair of elevator base members 50 are positioned substantially perpendicular to a corresponding end of each of the pair of elevator support members 50. The elevator base cross member 54 is positioned between each of the pair of elevator base members 52. Like the adjustable support cross members 18, the elevator cross member 48, the elevator support members 50, the elevator base members 52, and the elevator base cross member 54 are each preferable configured with slideable or telescoping members which define holes 26.

In operation, as shown in FIG. 2, containers 56 full of parts are loaded onto the lower conveyor assembly 30 and are moved along the lower conveyor assembly 30 by the conveyor track assembly 34, such as indexing rails 36, toward the workstation at the elevator assembly 38. The elevator assembly 38 may include a tiltable work platform to tilt the container 56 to allow easier access for a worker at the workstation. The worker removes the parts from the container 56 until the container 56 is empty. The worker then pushes a button on a control device to cause the elevator 46 to lift the empty container 56 to the upper conveyor assembly 32. The elevator 46 then returns to the workstation and a new, full container 56 is indexed onto the workstation. The empty container 56 on the upper conveyor assembly 32 is indexed rearwardly along the upper conveyor assembly 32 and is eventually off loaded and refilled.

As best shown in FIG. 3, in order to change the distance D between the support cross members 18, and hence the width of the framework 12, the locking bolt 28 is removed and the second member 24 is telescoped into or out of the first member 22. When the desired width has been reached, the locking bolt 28 is reinserted in an adjustment hole 26 of the first member 22 which aligns with one of the adjustment holes 26 in the second member 24 to hold the support cross member 18 at the new length. Additionally, the legs 14, 16 can also be similarly telescoping to allow the height of the framework 12 to be adjusted, however inserts 20 are preferred.

Therefore, as will be understood by one of ordinary skill in the art, the expandable line feed system of the present invention allows the user to modify the size of the line feed system to accommodate changes in part size due to changes in production needs. Should the size of the parts being carried by the system change, the line feed system of the invention can simply be expanded or contracted, as needed, to conform to the new part size.

While embodiments of the present invention have been described in detail herein, it will be appreciated by those skilled in the art that various modifications and alternatives to the embodiments can be developed in light of the overall teachings of the disclosure. Accordingly, the particular arrangements are illustrative only and are not limiting as to the scope of the invention which is to be given the full breadth of the above disclosure and any and all equivalents thereof. For example, other elevation means, such as scissor lifts, basket and winches, or other suitable devices may also be used.

I claim:

1. An over and under line feed system having a first end and a second end comprising:
   a plurality of first support legs;
   a plurality of second support legs, the plurality of second support legs spaced apart from the plurality of first support legs;
   a plurality of adjustable support cross members positioned between the first and second support legs;
   a conveyor assembly comprising a lower conveyor and an upper conveyor; and
   an elevator assembly positioned at the first end,
   wherein the elevator assembly comprises spaced elevator supports.

2. The line feed system as claimed in claim 1, wherein the plurality of adjustable support cross members lie in substantially the same imaginary plane.

3. The line feed system as claimed in claim 1 wherein the conveyor assembly comprises at least one conveyor track assembly and a plurality of indexing rails.

4. An over and under line feed system having a first end and a second end comprising:
- a plurality of first support legs;
- a plurality of second support legs, the plurality of second support legs spaced apart from the plurality of first support legs;
- a plurality of adjustable support cross members positioned between the first and second support legs;
- a conveyor assembly; and
- an elevator assembly positioned at the first end,
- wherein the elevator assembly comprises two substantially parallel elevator supports connected to each other by a support cross member, wherein at least one of the substantially parallel elevator supports is connected to the first end of the over and under line feed system.

5. The device as claimed in claim 1 wherein the elevator assembly further comprises a workstation.

6. The device as claimed in claim 1 wherein the elevator assembly further comprises an adjustable elevator.

7. An over and under line feed system having a first end and a second end comprising:
- a plurality of first support legs;
- a plurality of second support legs, the plurality of second support legs spaced apart from the plurality of first support legs;
- a plurality of adjustable support cross members positioned between the first and second support legs;
- a conveyor assembly; and
- an elevator assembly positioned at the first end,
- wherein the elevator assembly further comprises a movable elevator,
- wherein the movable elevator comprises an adjustable elevator cross member,
- a pair of adjustable, spaced-apart, elevator support members, a pair of adjustable, spaced-apart elevator base members, and an adjustable elevator base cross member, wherein the elevator cross member is positioned between the pair of elevator support members, and the adjustable elevator base cross member is positioned between the pair of elevator base members.

8. A method of converting an over and under line feed system to accommodate a larger or smaller container, the over and under line feed system having a first end, a second end, a plurality of adjustable first support legs, a plurality of adjustable second support legs, a plurality of adjustable support cross members, at least one support cross member connected substantially perpendicular to a corresponding one of the plurality of adjustable first support legs, and substantially perpendicular to a corresponding one of the plurality of adjustable second support legs, two movable elevator supports connected to each other by a support cross member, and an adjustable elevator positioned adjacent to the elevator supports comprising the step of adjusting at least one of the plurality of adjustable support cross members to a length greater than a width of the container.

9. The method as claimed in claim 8 further comprising the step of moving the two substantially-parallel elevator supports to a position substantially parallel to the plurality of adjustable cross members.

10. The method as claimed in claim 8 further comprising a plurality of inserts having a plurality of desired heights and further comprising the step of inserting at least one of the plurality of inserts into the adjustable first support legs to increase or decrease an overall length of each of the plurality of adjustable first support legs.

11. The method as claimed in claim 8 further comprising the step of adjusting the elevator to fit the larger or smaller container.

12. An over and under line feed system having a first end and a second end comprising:
- a plurality of adjustable first support legs;
- a plurality of adjustable second support legs spaced from the first support legs;
- a plurality of adjustable support cross members positioned between the first and second support legs;
- a conveyor assembly comprising a lower conveyor and an upper conveyor; and
- an elevator assembly positioned at the first end,
- wherein the elevator assembly comprises spaced elevator supports connected by a support cross member, and wherein at least one of the elevator supports is connected to the first end.

13. The device as claimed in claimed 12 wherein the conveyor assembly comprises a conveyor track assembly and a plurality of indexing rails.

14. An over and under line feed system having a first end and a second end comprising:
- a plurality of adjustable first support legs;
- a plurality of adjustable second support legs spaced from the first support legs;
- a plurality of adjustable support cross members positioned between the first and second support legs;
- a conveyor assembly; and
- an elevator assembly positioned at the first frame end,
- wherein the elevator assembly further comprises a movable elevator having an adjustable elevator cross member, a pair of adjustable elevator support members, a pair of adjustable elevator base members, and an adjustable elevator base cross member, wherein the adjustable elevator cross member is positioned between the pair of elevator support members, and the elevator base cross member is positioned between the pair of elevator base members.

* * * * *